United States Patent
Atsumi

(10) Patent No.: US 7,395,043 B2
(45) Date of Patent: Jul. 1, 2008

(54) DATA RECEIVER ADAPTIVE TO RSSI AND A METHOD OF DETERMINING ITS THRESHOLD

(75) Inventor: Tsuyoshi Atsumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 467 days.

(21) Appl. No.: 11/237,789

(22) Filed: Sep. 29, 2005

(65) Prior Publication Data

US 2006/0079196 A1 Apr. 13, 2006

(30) Foreign Application Priority Data

Oct. 8, 2004 (JP) ............................. 2004-296140

(51) Int. Cl.
*H04B 17/00* (2006.01)
(52) U.S. Cl. .................... 455/226.2; 455/132; 455/293; 455/134; 455/141; 455/168.1; 455/313
(58) Field of Classification Search .............. 455/226.2, 455/132, 293, 134, 141, 168.1, 313
See application file for complete search history.

(56) References Cited

U.S. PATENT DOCUMENTS

| 6,959,175 | B2 * | 10/2005 | Ohtaki ........................ 455/139 |
| 7,058,379 | B2 * | 6/2006 | Draijer ........................ 455/258 |
| 2004/0190658 | A1 * | 9/2004 | Ohtaki et al. ................ 375/347 |

FOREIGN PATENT DOCUMENTS

| JP | 2001-094505 | 4/2001 |
| JP | 2003-273796 | 9/2003 |

* cited by examiner

*Primary Examiner*—Sanh D. Phu
(74) *Attorney, Agent, or Firm*—Studebaker & Brackett PC; Donald R. Studebaker

(57) ABSTRACT

A modem generates a new RSSI threshold value in response to a flag signal representing the quality of the threshold value indicated by the result of error detection supplied from one monitor, and supplies the generated threshold value to another monitor. The RSSI threshold value set in the other monitor is rendered variable, the modem thus being able to operate with the threshold value converging precisely in a short time.

6 Claims, 8 Drawing Sheets

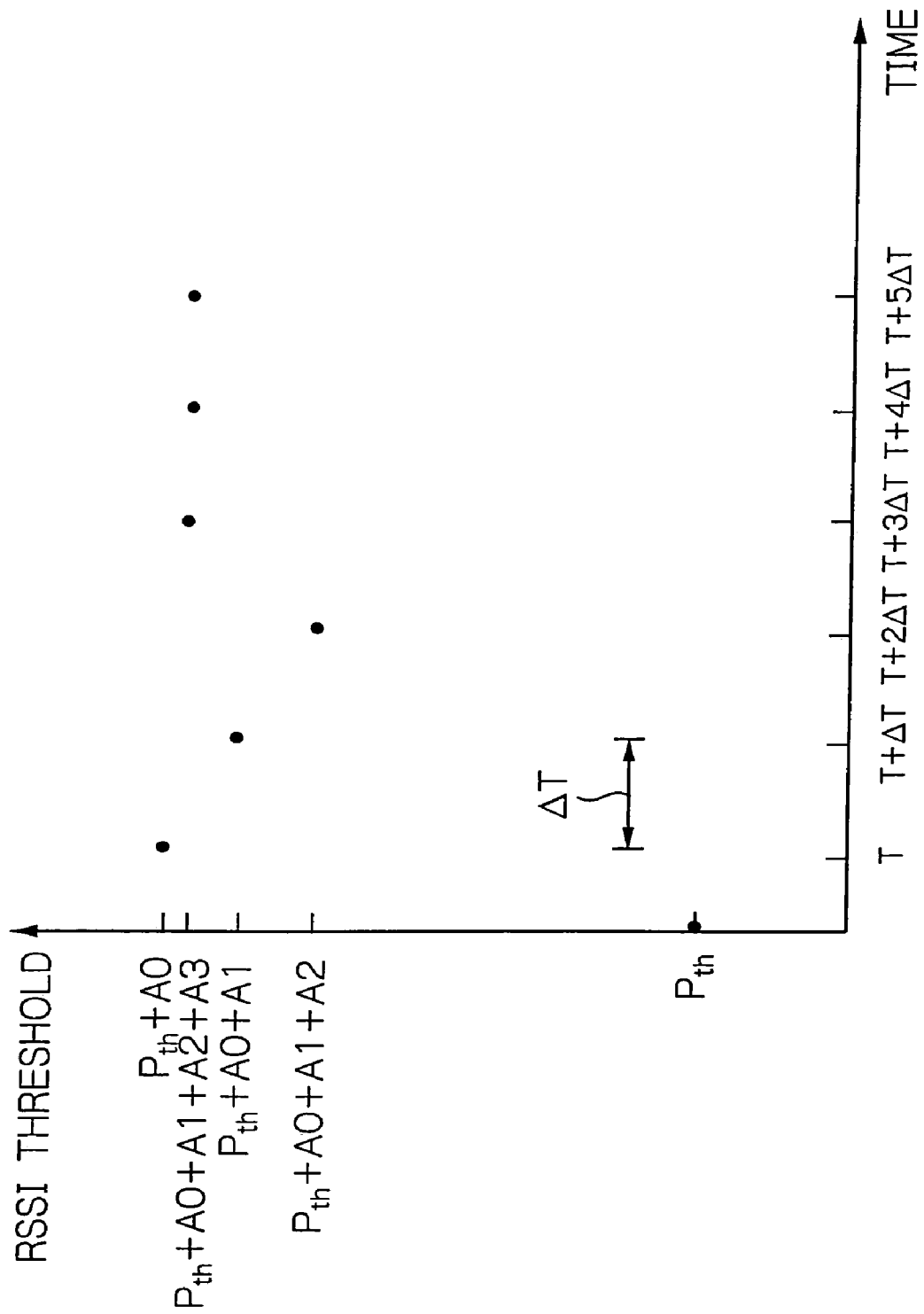

DATA RECEIVER ADAPTIVE TO RSSI AND A METHOD OF DETERMINING ITS THRESHOLD

BACKGROUND OF THE INVENTION

1. Field of the Invention

The present invention relates to a data receiver and a method of determining its threshold value. More specifically, the invention relates to a data receiver used in a wireless local area network (LAN) according to the standard IEEE (Institute of Electrical and Electronics Engineers) 802.11.

The invention also specifically relates to a method of determining the threshold value of a data receiver in which method he threshold value based on the received signal strength indication (RSSI) is adaptively changed so as to select and set an optimum threshold value in noisy environment.

2. Description of the Background Art

Conventional modems are adapted to be out of operation in order to reduce the power consumption thereof when a received signal is estimated by means of an RSSI signal. A wireless digital synchronized system disclosed in Japanese patent laid-open publication No. 2003-273796 has a configuration in which in order to reduce power consumption in a waiting period of time in which no data are transmitted and received between master and slave stations the power supply to the transmitter of the master station is interrupted by the first control while no data are transmitted and received, and when the RSSI voltage is detected higher than a predetermined level or predetermined demodulated data are detected the first control determines a call originating to switch the transmitter on accordingly.

A received signal is estimated by means of comparison of an RSSI signal obtained from the received signal with a predetermined threshold value, i.e. RSSI threshold value. In a highly noisy environment, however, the RSSI value of a received signal increases so high that the estimation of the received signal becomes difficult.

For example, in an intermittent receiving method disclosed in Japanese patent laid-open publication No. 2001-94505, an existing noise is erroneously determined as a carrier signal existing so that control frequently shifts itself to a continuous receiving state, therefore, power being supplied to the receiver circuit in a longer period of time. As a result, there is a phenomenon of short battery life. The mechanism of the phenomenon is understood such that, when the threshold values for determining a detected voltage are set so that a carrier is detected in the first stage of intermittent receiving and no carrier is detected in the second stage of intermittent receiving, a higher-noise level condition in the received frequency band is detected in such a manner that there is detected a carrier in the first stage of intermittent receiving although there are detected neither data nor carrier in the second stage of intermittent receiving to thereby render itself back to the first stage, the processes being repeated between the first and second stages of intermittent receiving. As the operating time increases in the second stage of intermittent receiving with the intermittent operation period shorter, the battery life becomes shorter.

In the intermittent receiving method taught in publication No. 2001-94505, the receiving control circuit is provided with a counter function which counts the number of repetitions between the first and second stages of intermittent receiving, and if the number of repetitions exceeds a predetermined value, the threshold value is then increased for determining whether or not the career exists in the first stage of intermittent receiving. By means of this processing, transfer to the second stage of intermittent receiving becomes more difficult and thus it is possible to keep the battery life long in noisy environment.

The threshold value adjusted by the above-mentioned conventional method can converge to a constant value when the environmental condition for radio wave propagation is calm. However, the environmental condition for radio wave propagation is not always calm, so that it may be disturbed turbulently. This turbulence includes noise deterioration and/or amelioration. The threshold value taught in the intermittent receiving method of publication No. 2001-94505 is only increased corresponding to the increase of the noise level. The intermittent receiving method of publication No. 2001-94505 is only directed to the threshold value responding in the deteriorating direction so that it cannot follow the change very well. That may cause unnecessary actions to be increased for adjusting to obtain the optimum threshold value, thus increasing power consumption.

SUMMARY OF THE INVENTION

It is an object of the present invention to provide a data receiver and a method of determining its threshold value which are able to follow the turbulent variation of the environmental condition for radio wave propagation and reduce the power consumption.

In accordance with the present invention, the data receiver comprises: a frequency converter for receiving a radio signal and for generating an RSSI (Received Signal Strength Indication) signal indicating a received signal strength indication level of the signal received, and converting the received signal to a base-band signal; a first converter for digitizing the base-band signal to produce first data; a second converter for digitizing the RSSI signal to produce second data; a first monitor for demodulating the first data, and for detecting error of demodulated data to determine quality of a threshold value for the RSSI signal; a second monitor for comparing a power level of the second data with the threshold value for the RSSI signal; and an output control circuit for supplying an enable signal to said frequency converter, said first and second converters, and said first and second monitors to control said frequency converter, said first and second converters, and said first and second monitors, and further providing the threshold value for the RSSI signal. Said output control circuit includes a threshold value generator for generating the threshold value for the RSSI signal corresponding to the quality of the threshold value determined.

In the data receiver according to the invention, the threshold value generator is responsive to the quality of the threshold value supplied from the first monitor to generate a newly generated RSSI threshold value to supply the value to the second monitor, the threshold value set in the second monitor being variable to converge, thus making it possible to reduce the convergence time of the RSSI threshold value and provide a precise threshold value of the RSSI signal Further, the method according to the invention comprises: a first step of receiving a radio signal, and adding, in a noise mode working intermittently, to an RSSI (Received Signal Strength Indication) signal indicating a received signal strength indication level of the signal received, a step size of a factor associated with generation of the threshold value; a second step of demodulating the received signal and detecting error of the signal demodulated; a third step of returning, in response to existence of the error, to said first step, and advancing, in response to absence of the error, to a first stage of optimizing the RSSI threshold value; a fourth step of subtracting a minute step size much smaller than the step size from the RSSI threshold value generated before advancing to said first stage; a fifth step of demodulating the received signal and detecting error of demodulated signal; a sixth step of returning, in response to the absence of the error, said fourth step, and advancing, in response to the existence of the error, to a second stage of optimizing the RSSI threshold value; a seventh step of adding the minute step size to the RSSI threshold value generated before advancing to said second stage; an eighth step of demodulating the received signal and detecting the error of the demodulated signal; and a ninth step of returning to said first step when the error is detected.

In the method of determining a threshold value according to the invention, in the noise mode, a step size, A, is added to the RSSI threshold value, and then error of the received signal is detected. Corresponding to whether or not error exists, the processing is advanced to the first step or to the first stage of optimizing the RSSI threshold value with a minute step size subtracted from the added RSSI threshold value before advancing to the first stage, error being detected again. After the detection, corresponding to whether or not the error exists, the processing is advanced to the second stage of optimizing or to the fourth step. Then, a minute step size is added to the RSSI threshold value, which is the result of operation done before the second stage, to detect error of the received signal again. By returning the processing to the first step corresponding to detected error, the RSSI threshold value is rendered variable to converge to a value optimal for the environmental condition. The method according to the invention is thus able to reduce the convergence time of the threshold value and provide a precise RSSI threshold value.

Further, the method according to the invention comprises: a first step of demodulating a received signal in a normal mode continuously working, and measuring a power level of the received signal; a second step of determining a noise power level based on a difference between an RSSI (Received Signal Strength Indication) signal value indicating a received signal strength indication level of the received signal in a noise mode working intermittently and the power level measured, and generating a step size based on an integral multiple of a value obtained by subtracting the RSSI threshold value in the normal mode from the noise power level; a third step of adding to RSSI threshold value a step size of a factor associated with generation of the threshold value; a fourth step of demodulating the received signal and detecting error of the signal demodulated; a fifth step of returning, in response to existence of the error, to said first step, and advancing, in response to absence of the error, to changing the RSSI threshold value; a sixth step of adding an integral multiple of the step size to the RSSI threshold value for changing the threshold value; a seventh step of demodulating the received signal and detecting error of the demodulated signal; and an eighth step of returning, in response to the existence of the error, to said first step, and advancing, in response to the absence of the error, to said sixth step.

In the method of determining a threshold value according to the invention, the received signal power level in the normal mode is measured, and the noise power level is decided as the difference between the RSSI signal level (power) and the measured power level of the received signal. Then, a step size is generated which is an integral multiple of the value obtained by subtracting the RSSI threshold value in the normal mode from the noise power level. Next, the step size is added to the RSSI threshold value to detect error. Corresponding to whether or not error exists, the processing is advanced to the first step or to the changing step of RSSI threshold value, in which a value obtained by adding an integral multiple of the step size is added to the RSSI threshold value to detect error again. Corresponding to whether or not the error exists, the processing is transferred to the first or sixth step. At a result, in fast-varying noise environment, the method according to the invention is able to obtain the RSSI threshold value by a single operation without repetition, and reduce the convergence time to the optimum RSSI threshold value.

BRIEF DESCRIPTION OF THE DRAWINGS

The objects and features of the present invention will become more apparent from consideration of the following detailed description taken in conjunction with the accompanying drawings in which:

FIG. 9 plots the transition of RSSI threshold values obtained by the operational procedure of the modem shown in FIG. 8.

DESCRIPTION OF THE PREFERRED EMBODIMENTS

The preferred embodiments of the data receiver according to the invention will be described in detail with reference to the accompanying drawings. The illustrative embodiment is directed to a modem 10 to which a data receiver is applied according to the invention.

Figure 1:
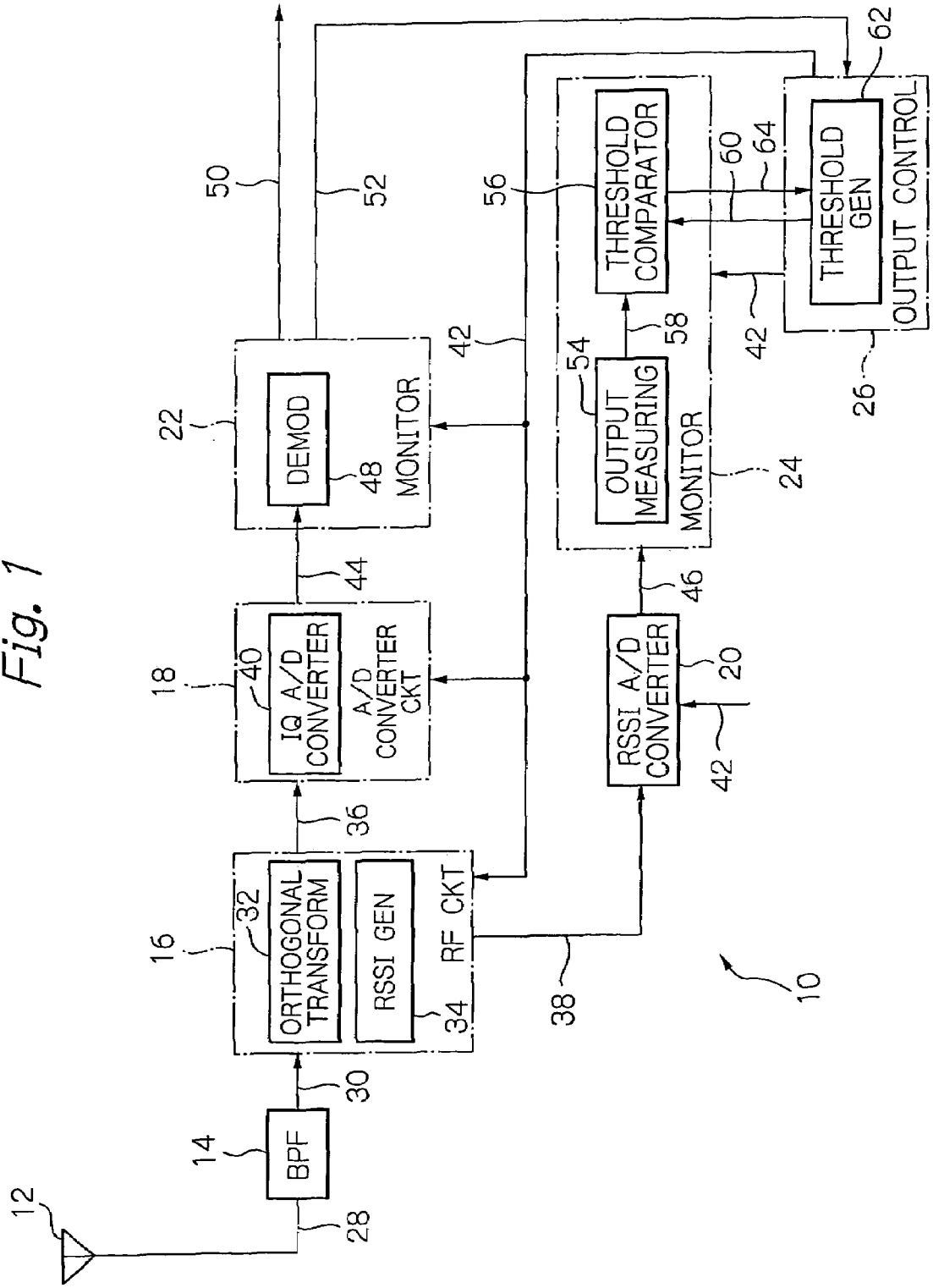
FIG. 1 is a schematic block diagram showing the modem of a preferred embodiment to which the data receiver is applied according to the invention.

As shown in FIG. 1, the modem 10 comprises an antenna 12, a bandpass filter (BPF) 14, a radio frequency (RF) circuit 16, an analog-to-digital (A/D) converter circuit 18, a received signal strength indication (RSSI) analog-to-digital converter 20, monitors 22 and 24, and an output control 26, which are interconnected as illustrated. For the modem 10 in FIG. 1, since the invention is aimed mainly at its receiver facility, description will be omitted on its transmitter facility. Likewise, elements not directly relevant to understanding the invention are omitted from the figures and description. The antenna 12 provides functions to catch incoming radio waves and emit a transmitting signal received from the RF circuit 16 in the form of radio waves, as well as to supply the received signal 28 to the RF circuit 16 on a fixed-gain transmission path.

The bandpass filter 14 has its bandwidth limited to obtain the received signal of in a frequency channel required. The bandpass filter 14 supplies the RF circuit 16 with the received signal 30 thus band-limited. In the following, signals are designated with reference numerals of connections on which they appear.

The RF circuit 16 consists of an orthogonal transform circuit 32 and an RSSI generator 34. In the receiving mode, the RF circuit 16 has its function to suppress variation in the received signal 30 with automatic gain control (AGC), and is controlled in response to a control signal output from the monitor 24, which will be described later. The orthogonal transform circuit 32 quadrature-detects the received signal 30 having its level thus controlled, thus orthogonal-transforming the received signal. The orthogonal transform circuit 32 outputs base-band I (In-phase) and Q (Quadrature) component signals 36 thus obtained by its orthogonal transform to the A/D converter circuit 18. The RSSI generator 34 is responsive to the received signal 30 having its level controlled to generate an RSSI signal. The RSSI generator 34 outputs the RSSI signal 38 thus generated to the RSSI A/D converter 20.

The A/D converter circuit 18, in practice, includes an IQ A/D converter 40. The IQ A/D converter 40 also includes an I A/D converter and a Q A/D converter which are not shown specifically. The IQ A/D converter 40 digitizes the inputted signal 36 in response to the enable signal 42 supplied from the one monitor 24 and outputs the digitized data 44 to the other monitor 22.

The RSSI A/D converter 20 functions as digitizing the supplied RSSI signal 38. The RSSI A/D converter 20 supplies the digitized data 46 to the monitor 24.

The monitor 22 includes a demodulator 48. The demodulator 48 is adapted to output demodulated data 50 and also to detect error of the demodulated data 50 to output a flag signal 52, based on the result of the error detection, the signal representing whether or not error exists. The demodulator 48 supplies the flag signal 52 to the output control 26.

The monitor 24 includes an output measuring circuit 54 and a threshold comparator 56. The output measuring circuit 54 serves as measuring the power of the data supplied from the RSSI A/D converter 20. The output measuring circuit 54 supplies the thus measured power level to the threshold comparator 56. The threshold comparator 56 has a function of comparing the RSSI power level supplied with a threshold value 60, represented with Pth, supplied from the output control 26. The threshold comparator 56 may be adapted to supply, for example, the result of the comparison and the measured RSSI power level to a threshold value generator 62.

The output control 26 includes the threshold value generator 62. The output control 26 includes a function which controls the output signal level according to the normal or noise mode provided in the system. The normal and noise modes are referred to the conditions of operating the structural elements including the RF circuit 16 and the circuits following thereto adaptively to the environmental effect of the system. The normal mode refers to an operating condition set for lower-noise environment, and the noise mode to an operating condition set for higher-noise environment. Output control in the noise mode will be further described later.

Corresponding to the normal or noise mode, the output control 26 constantly or intermittently outputs an enable signal 42 outputs enable signal. The threshold generator 62 has its function which generates and outputs the threshold value 60, Pth, to be compared with the power level 58, and furthermore, changes the threshold value 60, Pth, in response to the flag signal 52 and outputs it. The output control 26 outputs the generated enable signal 42 to the RF circuit 16, A/D converter circuit 18, monitor 22 and RSSI A/D converter 20 in order to control their operation.

Next, the operation in the noise mode will be described, which is one of the features of the modem 10. In the noise mode, the threshold value 60 is a threshold value on the RSSI output and represented with a variable, Pth. On the other hand, in the normal mode the threshold value 60, Pth, is set invariable i.e. converged to a constant value.

After the operation is transferred to noise mode, the measurement of an RSSI power level and the detection of error, i.e. calculation of an error bit rate are carried out whenever the enable signal is intermittently supplied with a constant time interval, ΔT. The times of repetition in the processings executed in a time interval, ΔT, are defined by variables, M, N and α. The variable, M, is initially set to zero as shown in step S10, FIG. 2.

Next, decision is made on whether or not the times of repetition, M, reach a predetermined value (step S12), where M is a natural number. When the times of repetition, M, do not reach the predetermined value (NO), the processing goes to the threshold value generating step S12. When the times of repetition, M, reach the predetermined value (YES), the processing goes to the next threshold value setting step S16.

Next, the threshold value setting step wherein a step size, A, is added to the threshold value 60, i.e. Pth, to raise the threshold value 60 (step S14). Under this condition the demodulator 48 demodulates the received data 44 and detects error (step S18). Decision is made on whether or not error exists at the error detection in connection with the demodulation (step S20). When error is detected (YES), the processing goes to the counting step S22. When error is not detected (NO), the processing goes to the next threshold value optimizing step S16 in order to optimize the threshold value, moreover.

In the counting step, the threshold value 60 is increased by adding unity to the variable, M, i.e. the times of repetition, and then the processing goes back to the counting step S22 in order to eliminate error. If the error is not eliminated, after such M times of the repetition, the RSSI threshold value 60, Pth, becomes to the value expressed by $$\text{RSSI threshold value } Pth = Pth + M \times A. \tag{1}$$

Figure 3:
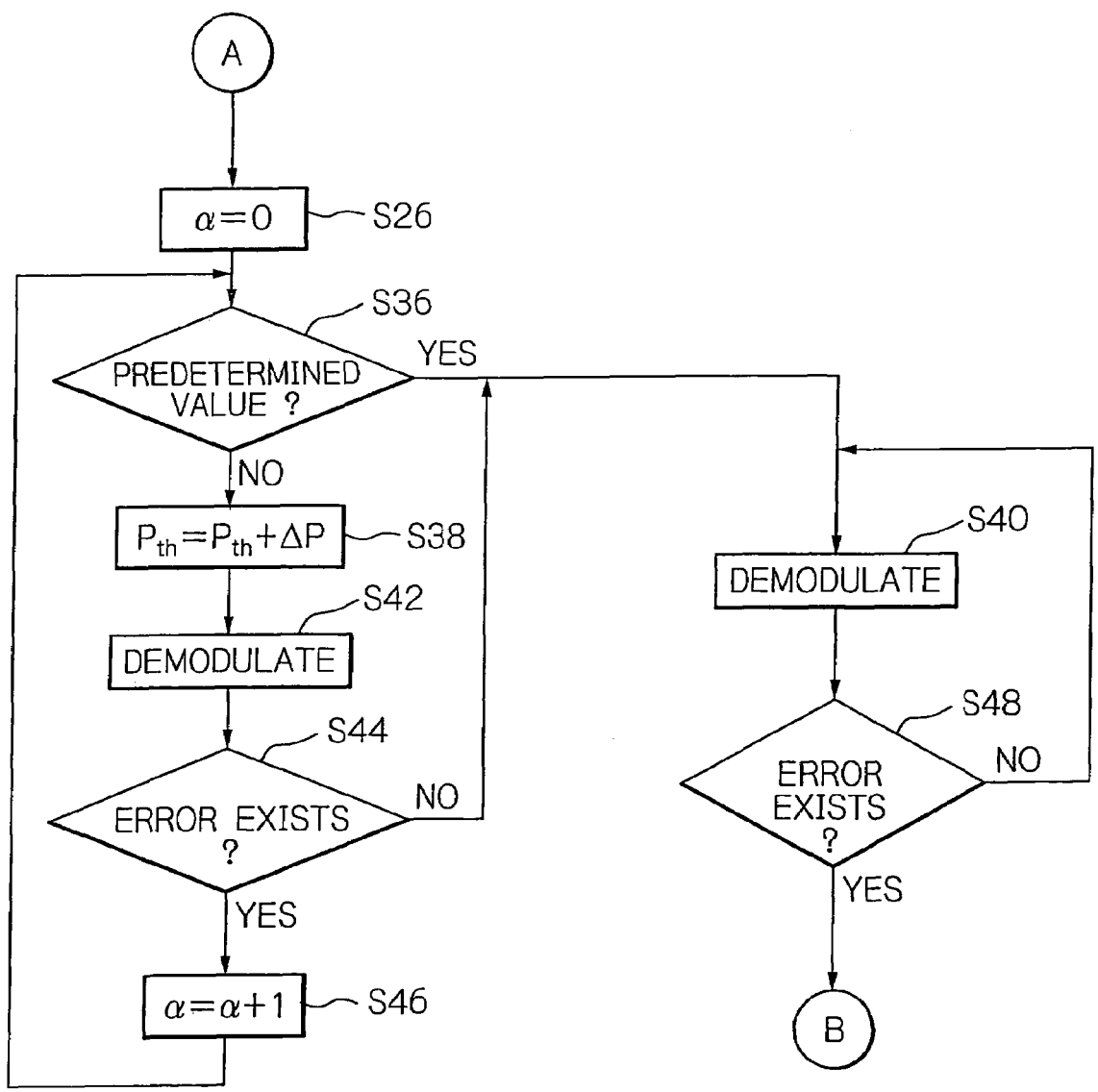

Now, the processing goes to the threshold value optimizing step S24. Initially, the variable representative of the repetition times, N, is set to zero (step S16). Next, decision is made on whether or not the times of repetition, N, reach a predetermined value (step S24). When the times of repetition, N, do not reach the predetermined value (NO), the processing goes to the threshold value generating step S26. When the times of repetition, N, reach the predetermined value (YES), the processing goes via a connecter A to the next threshold value setting step S26 as shown in FIG. 3.

In the threshold value setting step with a variable representative of the repetition times, N, a step value, ΔP, is used which is sufficiently smaller than the step size, A, used for the threshold value at the step 14, to adjust again the RSSI threshold value 60, Pth (step S24). Specifically, a step value, ΔP, is subtracted from the RSSI threshold value 60, Pth, defined by the expression (1) to now decrease the RSSI threshold value 60, Pth. After that, the processing consecutively goes to the demodulating step S30 and the decision step S32 for error detection. The demodulation process may be the same as the above-mentioned process in the step S18. However, the decision step for error detection is different from the above-mentioned step 20. When the error is not detected (NO), the processing goes to the counting step S34. When the error is detected (YES), the processing goes to the next threshold value optimizing step S26 via the connecter A in order to optimize moreover.

At the counting step S34, the times of repetition, N, are incremented by adding unity (step S34). After the counting step S34, the processing goes back to the counting decision step S24. If the error is not eliminated in this step, after the N times of repetition the RSSI threshold value 60, Pth, is expressed by $$\text{RSSI threshold value } Pth = Pth + M \times A - N \times \Delta P. \quad (2)$$

In the step, when error is still detected after N times of repetition, the RSSI threshold value should be set to a value larger than the above-mentioned value. The threshold value in the context resides in the vicinity of the targeted RSSI threshold value. Now, the processing goes to the next threshold value optimizing step S26 via the connector A as shown in FIG. 3. Initially, the variable representative of the repetition times, α, is set to zero (step S26). Next, decision is made on whether or not the times of repetition, α, reach a predetermined value (step S36). When the times of repetition, α, do not reach the predetermined value (NO), the processing goes to the threshold value generating step S38. When the times of repetition, α, reach the predetermined value (YES), the processing goes to demodulating step S40.

In the step S38, the step value, ΔP, is added to the threshold value 60 of the expression (2) to increase the RSSI threshold value 60, Pth. After that, the processing consecutively goes to the demodulating step S42 and the decision step for error detection (step S44). The demodulation process is the same as the above-mentioned process in the steps S18 and S20. More specifically, when error is not detected any more (NO), it is decided that the optimum RSSI threshold value is obtained, the control being transferred to the demodulation step S40. When the error is detected (YES), it is decided that the optimum RSSI threshold value is not yet attained, the processing going to the counting step S46.

Next, in the counting step S46, the times of repetition, α, are incremented by one. After the counting step S46, the processing goes back to the other counting step S36. When the variable, α, is defined as the repetition times of RSSI adjustment, the finally obtained RSSI threshold value 60, Pth, is expressed by $$\text{RSSI threshold value } Pth = Pth + M \times A - N \times \Delta P + \alpha \times \Delta P. \quad (3)$$

Therefore, the times of RSSI adjustment, i.e. the number of cycles will finally be equal to (M+N+α). In the demodulation, the received signal is thus demodulated with error detected (step S40).

Successively, decision is made on whether or not any error exists in the RSSI threshold value 60, Pth, expressed by the expression (3). When error is detected again (YES), the processing goes back to the initializing step S10 via the connecter B in order to start over the threshold value generation. When error is not detected (NO), demodulation is repeated by using this threshold value (step S40).

Figure 2:
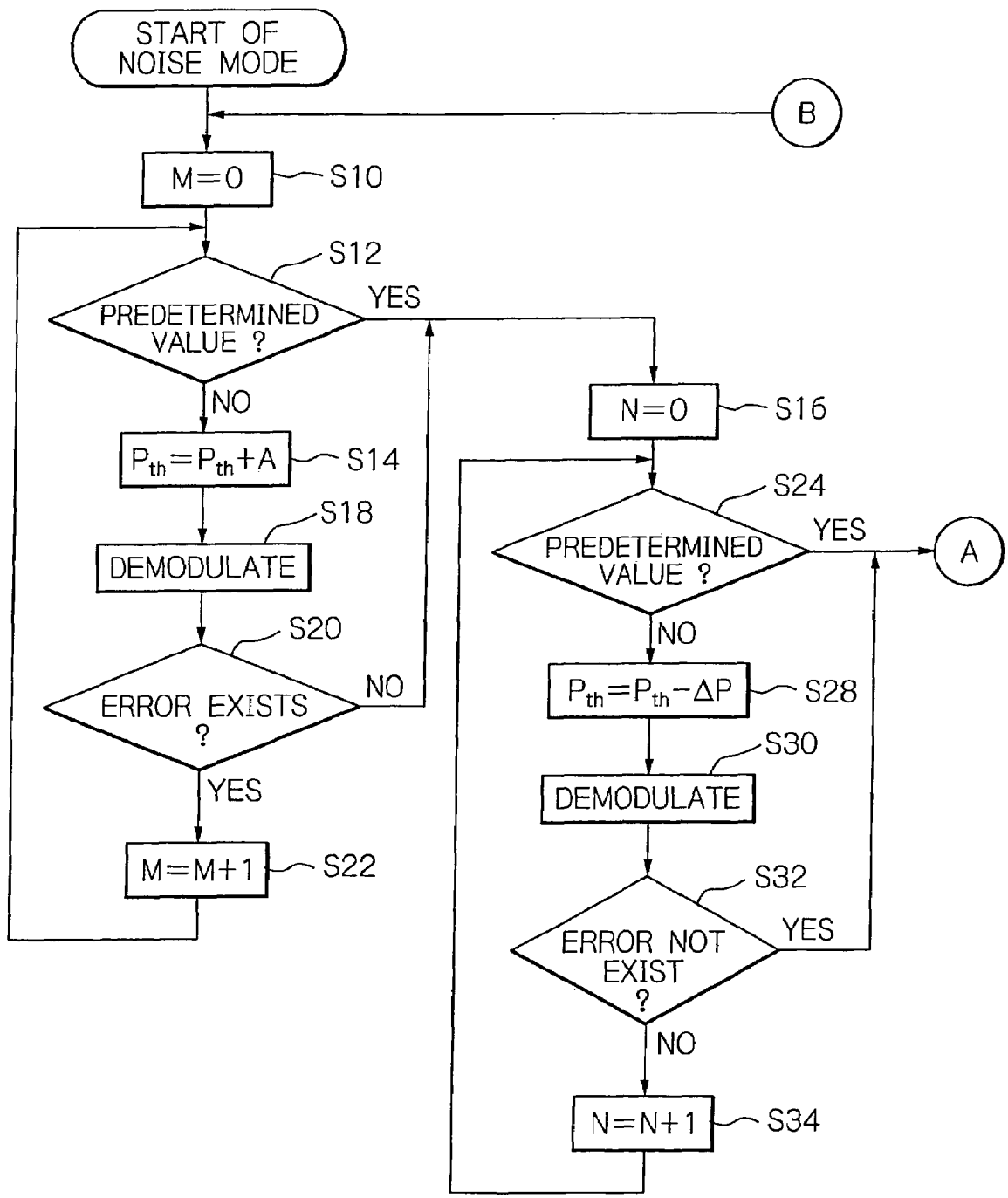
FIGS. 2 and 3 are flow charts useful for understanding explains the operational procedure for adjusting and setting a threshold value in the noise mode of the modem shown in FIG. 1.
Figure 4:
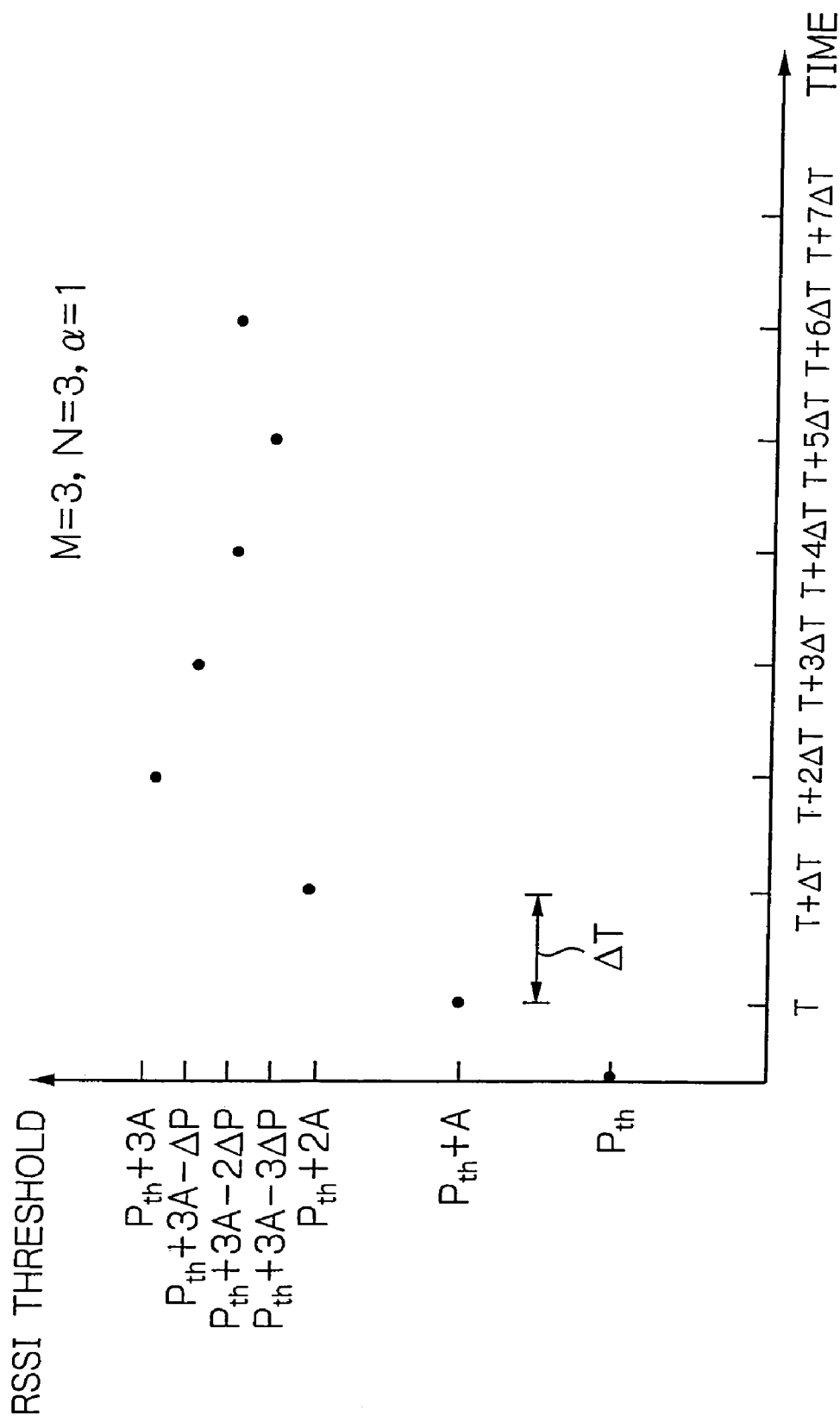
FIG. 4 plots the transition of RSSI threshold values based on the operational procedure shown in FIGS. 2 and 3.

The transition of the RSSI threshold value obtained by the processing in FIGS. 2 and 3 is shown in FIG. 4. With the time, ΔT, passing, the RSSI threshold value converges to a certain value. This convergence value is the optimum RSSI threshold value. In this case, the total number of cycles, or the number of operating the RSSI threshold value, is equal to M+N+α=3+3+1=7. The processing renders it possible to continuously obtain and calculate out the optimum RSSI threshold value corresponding to the noise fluctuation.

The modem 10 is thus adapted for estimating a received signal in the noise mode with the RSSI threshold value variable, thereby attaining a higher accuracy in the RSSI threshold value measurement in comparison with conventionally used RSSI threshold value, and removing an unnecessary operation in the receiver modem to reduce power consumption.

Figure 5:
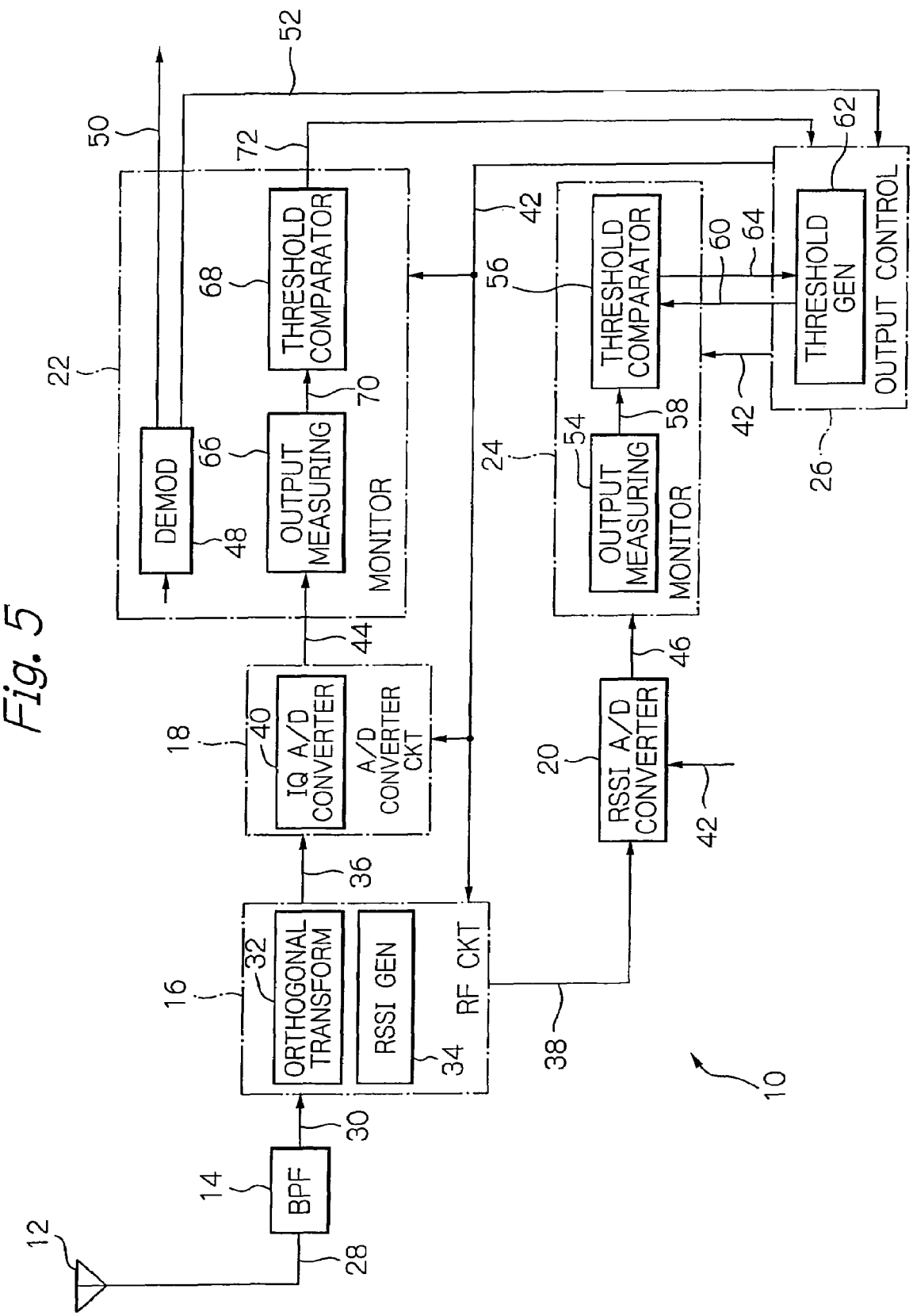
FIG. 5 is a schematic block diagram, similar to FIG. 1, of the modem of an alternative embodiment to which the data receiver is applied according to the invention.

Well, an alternative embodiment will be described in which the data receiver according to the invention is applied to the modem 10. The structure of the alternative embodiment is schematically shown in FIG. 5. In the figures and description associated therewith, like structural elements are designated with the same reference numeral, and a redundant description will be omitted just for simplification. In the modem 10 of the alternative embodiment, the monitor 22 consists of, in addition to the demodulator 48, an output measuring circuit 66 and a threshold comparator 68, which are interconnected as illustrated.

The output measuring circuit 66 functions as measuring the power of the supplied data 44. The output measuring circuit 66 supplies measured power data 70 to the threshold comparator 68. The threshold comparator 68 includes the function of comparing the supplied power data 70 with a predetermined fixed threshold value and generating a flag signal when the power data 70 are larger than the fixed threshold value. The threshold comparator 68 makes power data 70 pass through and outputs the latter to the output control 26 as power data 72.

The output control 26 functions as estimating noise power and generating an RSSI threshold value. The output control 26 thus functions as estimating means of noise power. The output control 26 is supplied with both the RSSI power level included in the data 64 supplied after the transfer to the noise mode and the power data 72, i.e. the carrier power data in the normal mode. The output control 26 estimates the noise power by the following expression, $$\text{noise power} = RSSI - C, \quad (4)$$

where RSSI represents a power level included in the RSSI power data 64 and C represents the power data 72. The unit of power used in the expression (4) is [w] (watt) in power value, or the replaced unit for indication.

Figure 6:
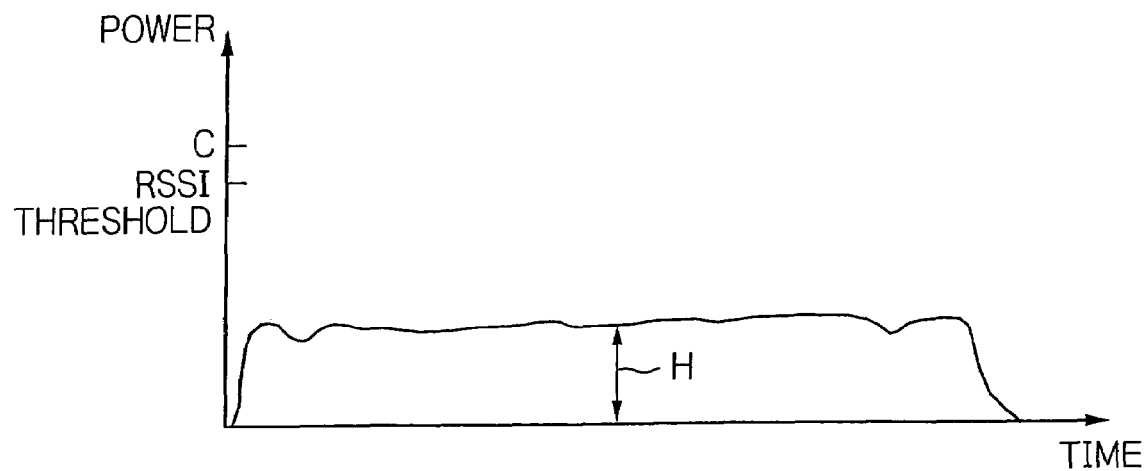
FIG. 6 plots the relation between the noise power and RSSI threshold values.

Next, the operation of the modem 10 will be described. Fundamentally, the operation may be the same as described of the embodiment shown in and described with reference to FIGS. 1 through 4. The transition of the carrier power level and noise power level of this alternative embodiment will be understood with reference to FIG. 6. In this figure, the parameter H is a noise power level. The RSSI step size, A, described in the previous embodiment is now changeable according to the transition of the noise power. The step size or width, A, is expressed by $$A = (\text{noise power level}) - (RSSI \text{ threshold value in normal mode}) + \Delta \quad (5)$$

A more accurate RSSI step size, A, is estimated by this expression. In the expression, Δ is defined as an integral multiple of the quantized minimum step size. Therefore, Δ is expressed by $$\Delta = (\text{quantized minimum step size}) \times (\text{integer}) \quad (6)$$

The RSSI threshold value is a minimum RSSI value that complies with the size conditional relation, H<RSSI value<carrier power level.

Figure 7:
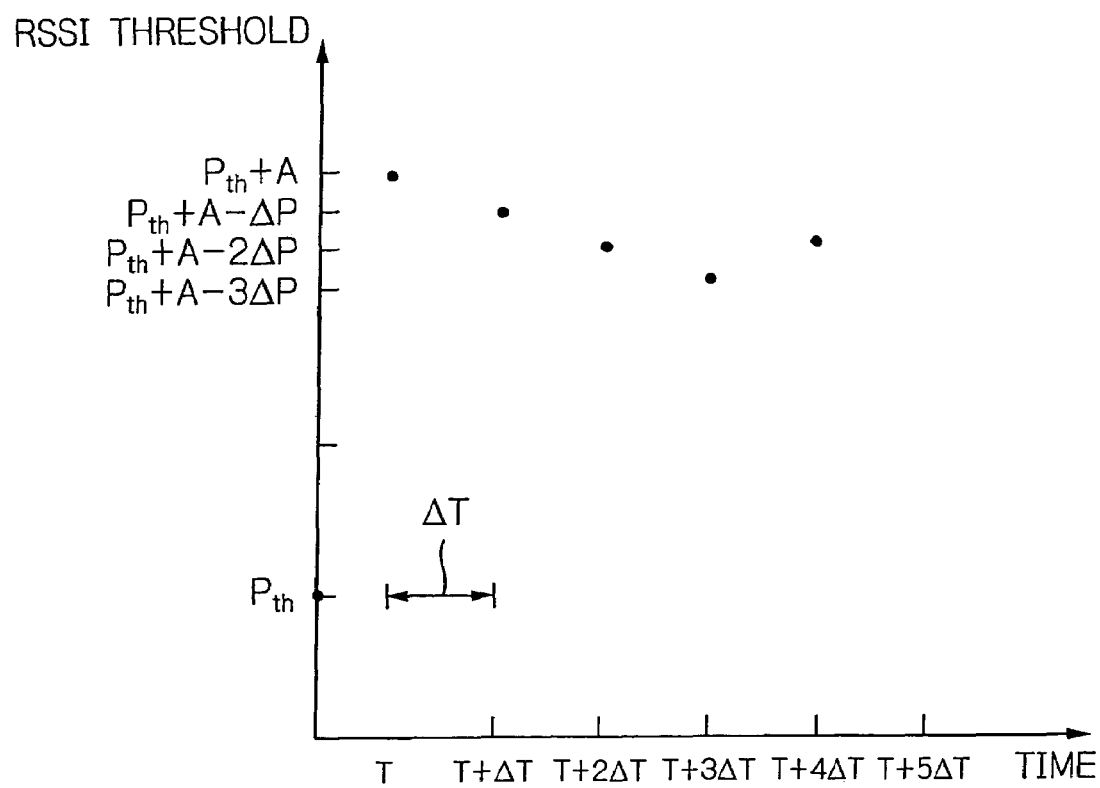
FIG. 7 plots the transition of RSSI threshold values obtained by the operational procedure of the modem shown in FIG. 5.
Figure 8:
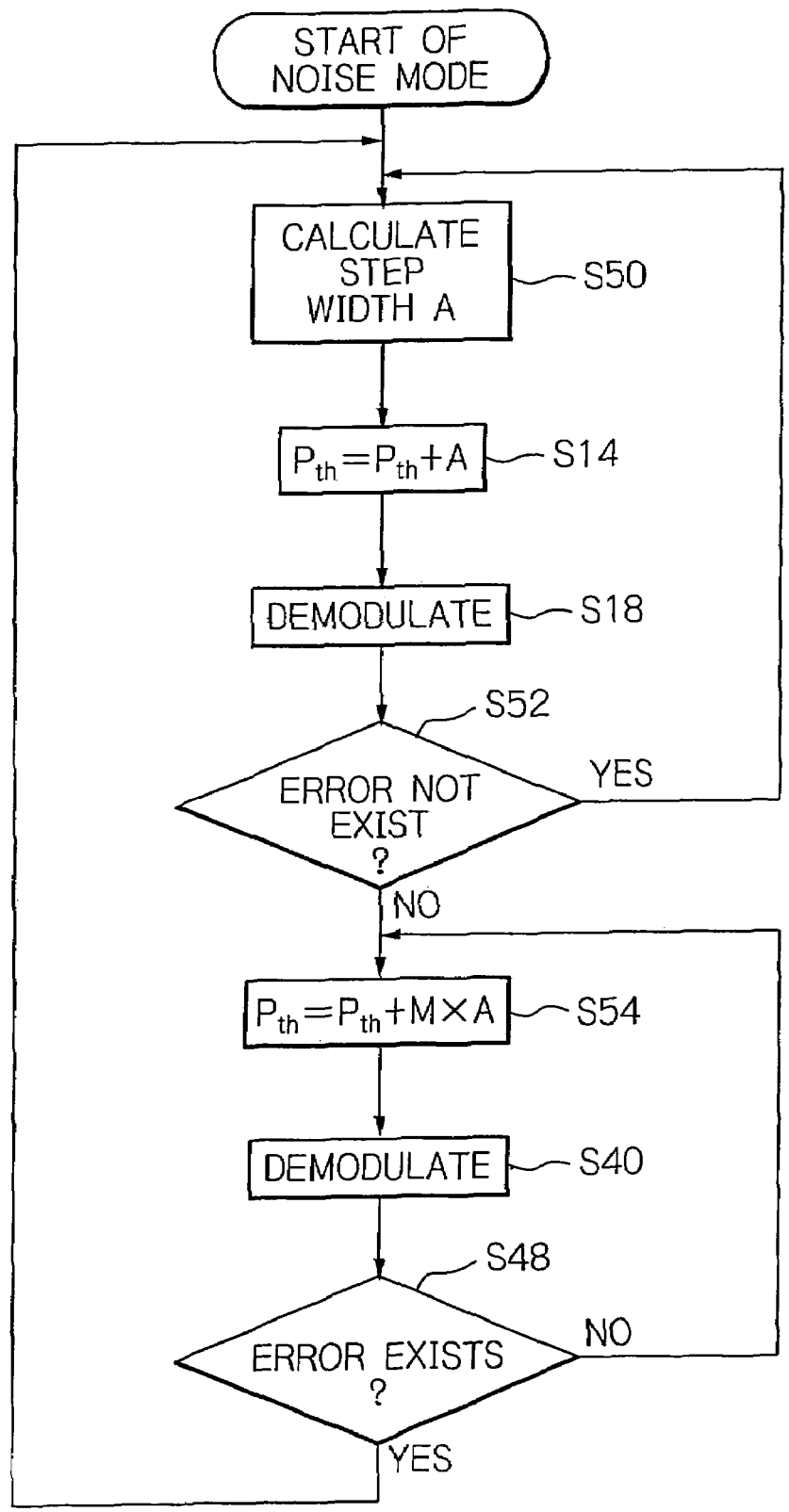
FIG. 8 is a flow chart useful for understanding the operational procedure for adjusting and setting the threshold value in the noise mode of the modem shown in FIG. 5.

The quantization level of the RSSI value is thus increased so as to accordingly attain a more accurate RSSI threshold value. The transition of the RSSI threshold value in the alternative embodiment is depicted in FIG. 7. Comparing with the transition of the RSSI threshold value shown in FIG. 4 wherein the step size, A, is fixed, the alternative embodiment makes it possible to reduce the convergence time of the RSSI threshold value. In this case, the total number of cycles, i.e. the times of operating the RSSI threshold value, is equal to $M+N+\alpha=1+3+1=5$. Comparing with the number of cycles in the transition of the RSSI threshold value shown in FIG. 4, it is possible for the instant alternative embodiment to reduce the required number of cycles.

In the instant alternative embodiment, the received carrier power is detected to estimate the noise power, and the RSSI step size, A, employed by the previous embodiment is made changeable so as to enable an accurate RSSI threshold value to be estimated within a shorter period of time. This application is much more effective in the environment of slower noise variation. In the normal mode, it is also possible in very lower-noise environment to recognize the received power as carrier power.

Another alternative embodiment will be described in which the data receiver according to the invention is applied to the modem 10. The present alternative embodiment may be the same as the previous embodiment in that the RSSI step size, A, changes according to the instantaneous noise power to thereby rapidly calculate out the optimum RSSI threshold value, and except that it is more effectively operable in the environment of much large noise variation.

In this alternative embodiment, the RSSI step size, A, is expressed as below, $$A=INT\{(\text{noise power level})-(RSSI \text{ threshold value in normal mode})\}>0. \quad (7)$$

The expression (7) is derived from the previous expression (5) with the term, $\Delta$, eliminated. The RSSI step size, A, is an integer larger than zero. By calculating the RSSI step size, A, using the expression (7), it is possible to pursue the RSSI threshold value faster.

In operation, when starting the noise mode of the modem 10 of the alternative embodiment, the step size, A, is calculated out by using the expression (7) (step S50). Next, the RSSI threshold value is generated so as to reflect the result from the calculation (step S14). Thus, the instantaneous optimum RSSI threshold value is calculated out. Under this condition, the data 44 are demodulated and error is detected (step S18).

Next, control transfers to the step S52 so that decision is made for the error detection. According to the decision, when the error is not detected (NO), the processing goes to threshold value generating step S54. When error is detected (YES), the processing goes back to the step S50 for calculating the next step size, A.

Next, the threshold value is generated (step S54). Using the step size, A, the threshold value generator 62 reduces the value in order to obtain a more optimum threshold value. Therefore, if the step size, A, is positive the variable, M, is then set negative, whereas if the step size, A, is negative the variable, M, is then set positive. Using the threshold value thus generated, the data are demodulated (step S40) and decision is made on whether or not error exists therein (step S48). When the error is not detected (NO), the processing goes back to the threshold value generating step S54. When error is detected (YES), the processing goes back to the step size calculating step S50 to calculate a new step size, A.

In this operation, the RSSI threshold value transits as shown in FIG. 9, for example, with the passage of time. In the figure, the RSSI step size, A, calculated take the values of A0, A1, A2 and A3 in the calculation order. It is thus possible to pursue the optimum RSSI threshold value in a shorter period of time in the environment of very turbulent noise power.

By means of the configuration described above, the modem 10 generates a new RSSI threshold value by the threshold generator 62 in response to the flag signal 52 representing the quality, appropriate or not, of the present threshold value based on the result of error detection supplied from monitor 22 to supply the threshold value 60 to monitor 24, thus the RSSI threshold value set for the monitor 24 being variable to allow the threshold value to converge. That causes the convergence time of the RSSI threshold value to be reduced, thereby providing a higher precision in the RSSI threshold value and reducing power consumption by time reduction.

The monitor 22 measures the power of data 44 in the normal mode, and the threshold generator 62 of the output control 26 estimate noise power based on the difference between the RSSI signal 64 and the received signal power 72 supplied thereto. Then, the step size to be added to the RSSI threshold value 60, Pth, is changed according to the transition of the noise power thus estimated, and the different RSSI step sizes are thus employed until convergence is made. The time required to reach a targeted optimum value can thus be reduced.

In the method of determining the threshold value according to the invention, a step size, A, is added to the RSSI threshold value, Pth, in the noise mode and then error of a received signal is detected. Corresponding to whether or not error exists, the processing is advanced to the step S14 or to the RSSI threshold value optimizing step S16. A minute step size, $\Delta P$, is subtracted from the RSSI threshold value, Pth, thus added to detect error again. After the detection, corresponding to whether or not error exists, the processing is advanced to the step S28 or S26 of the second stage of optimization. At the second stage, the minute step size, $\Delta P$, is added to the RSSI threshold value obtained as the result from the operation done before the second stage to detect error again. If error still remains, the processing is initialized and goes back to the step S14. By means of the procedure, the RSSI threshold value is rendered variable or adaptive and converges to the threshold value optimized to the environmental condition. It is thus possible to reduce the convergence time of the RSSI threshold value and provide the RSSI threshold value in higher precision. Signal can be reliably received in the noise mode within a shorter period of time than the conventional method, and therefore unnecessary modem operation is removed. As a result, reduction of power consumption is accomplished. Especially, the method is much more effective under the slowly fluctuating noise environment.

In the method of determining the threshold value, before the step S14, the received signal is demodulated in the normal mode and its power level is measured, and the difference between the RSSI data 58 and the measured power level is defined as the noise power. From the noise power, the RSSI threshold value in the normal mode is subtracted, and to the resultant value of the subtraction, the value, A, that is an integral multiple of the quantized minimum width is added to generate the step size, A. The RSSI step sizes which are different in such a way are used until convergence is accomplished, so that the time required to reach the targeted optimum value can be reduced.

Also, by selecting and using an RSSI threshold value that is larger than the measured noise power level, thus approximating the measured power level, the convergence time of the RSSI threshold value can be reduced.

Further, in the method of determining the threshold value according to the invention, in the normal mode the received signal power level is measured, and in the noise mode the difference between the RSSI signal value (power) and the measured received signal power level in the normal mode is defined as the noise power. From said noise power, the RSSI threshold value in the normal mode is subtracted, and an integral multiple of the value resultant from the subtraction is generated as the step size, A, which is in turn added to the RSSI threshold value, Pth. Then error is detected. After the detection, corresponding to whether or not error exists, the processing is advanced to the step S50 or to the changing step S54 of the RSSI threshold value, Pth. In the step of changing the RSSI threshold value, Pth, an integral multiple of the step size, MA, is added to the RSSI threshold value, Pth, and error is detected again. After this detection, corresponding to whether or not error exists, the processing goes to the step S50 or S54. The aforementioned procedure makes it possible in a turbulent noisy environment to obtain an optimum RSSI threshold value through a single operation without repeating the RSSI threshold value generation, thus reducing the time required for converging to the optimum RSSI threshold value. Especially, the method is very effective in abruptly varying-noise environment and can reduce unnecessary power consumption.

The entire disclosure of Japanese patent application No. 2004-296140 filed on Oct. 8, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A data receiver comprising:
a frequency converter for receiving a radio signal and for generating an RSSI (Received Signal Strength Indication) signal indicating a received signal strength indication level of the signal received, and converting the received signal to a base-band signal;
a first converter for digitizing the base-band signal to produce first data;
a second converter for digitizing the RSSI signal to produce second data;
a first monitor for demodulating the first data, and for detecting error of demodulated data to determine quality of a threshold value for the RSSI signal;
a second monitor for comparing a power level of the second data with the threshold value for the RSSI signal; and
an output control circuit for supplying an enable signal to said frequency converter, said first and second converters, and said first and second monitors to control said frequency converter, said first and second converters, and said first and second monitors, and further providing the threshold value for the RSSI signal;
said output control circuit including a threshold value generator for generating the threshold value for the RSSI signal corresponding to the quality of the threshold value determined.

2. The receiver in accordance with claim 1, wherein said first monitor includes an output measuring circuit for measuring the power level of the received signal in a normal mode;
said threshold value generator estimating the noise power level based on a difference between the RSSI signal and the power level of the received signal in the normal mode, said threshold value generator being in response to transition of the noise power level estimated to change a step size of a factor associated with generation of the threshold value.

3. A method of determining a threshold value, comprising:
a first step of receiving a radio signal, and adding, in a noise mode working intermittently, to an RSSI (Received Signal Strength Indication) signal indicating a received signal strength indication level of the signal received, a step size of a factor associated with generation of the threshold value;
a second step of demodulating the received signal and detecting error of the signal demodulated;
a third step of returning, in response to existence of the error, to said first step, and advancing, in response to absence of the error, to a first stage of optimizing the RSSI threshold value;
a fourth step of subtracting a minute step size much smaller than the step size from the RSSI threshold value generated before advancing to said first stage;
a fifth step of demodulating the received signal and detecting error of demodulated signal;
a sixth step of returning, in response to the absence of the error, said fourth step, and advancing, in response to the existence of the error, to a second stage of optimizing the RSSI threshold value;
a seventh step of adding the minute step size to the RSSI threshold value generated before advancing to said second stage;
an eighth step of demodulating the received signal and detecting the error of the demodulated signal; and
a ninth step of returning to said first step when the error is detected.

4. The method in accordance with claim 3, further comprising:
a tenth step of demodulating, prior to said first step, the received signal in a normal mode continuously working, and measuring the power level of the received signal; and
an eleventh step of determining the noise power level based on a difference between the RSSI signal value and the power level measured, and adding, to a value obtained by subtracting from the noise power level determined the RSSI threshold value in the normal mode, an integral multiple of a quantized minimum width to thereby generate a new step size having a different value.

5. The method in accordance with claim 4, the RSSI threshold value is selected larger than the noise power level.

6. A method of determining a threshold value, comprising:
a first step of demodulating a received signal in a normal mode continuously working, and measuring a power level of the received signal;
a second step of determining a noise power level based on a difference between an RSSI (Received Signal Strength Indication) signal value indicating a received signal strength indication level of the received signal in a noise mode working intermittently and the power level measured, and generating a step size based on an integral multiple of a value obtained by subtracting the RSSI threshold value in the normal mode from the noise power level;
a third step of adding to RSSI threshold value a step size of a factor associated with generation of the threshold value;
a fourth step of demodulating the received signal and detecting error of the signal demodulated;
a fifth step of returning, in response to existence of the error, to said first step, and advancing, in response to absence of the error, to changing the RSSI threshold value;

a sixth step of adding an integral multiple of the step size to the RSSI threshold value for changing the threshold value;

a seventh step of demodulating the received signal and detecting error of the demodulated signal; and an eighth step of returning, in response to the existence of the error, to said first step, and advancing, in response to the absence of the error, to said sixth step.

* * * * *